US012178776B2

(12) United States Patent
Spychalski

(10) Patent No.: US 12,178,776 B2
(45) Date of Patent: Dec. 31, 2024

(54) WALKER SHELF SYSTEM

(71) Applicant: Donald Spychalski, Bay City, MI (US)

(72) Inventor: Donald Spychalski, Bay City, MI (US)

(*) Notice: Subject to any disclaimer, the term of this patent is extended or adjusted under 35 U.S.C. 154(b) by 162 days.

(21) Appl. No.: 18/098,527

(22) Filed: Jan. 18, 2023

(65) Prior Publication Data

US 2024/0238150 A1 Jul. 18, 2024

(51) Int. Cl.
*A61H 3/04* (2006.01)
*A61H 3/00* (2006.01)

(52) U.S. Cl.
CPC ......... *A61H 3/04* (2013.01); *A61H 2003/004* (2013.01)

(58) Field of Classification Search
CPC .................... A61H 2003/004; A61H 2003/002
See application file for complete search history.

(56) References Cited

U.S. PATENT DOCUMENTS 3,232,251 A * 2/1966 Hughes .................... A61H 3/00 108/50.16
3,516,425 A * 6/1970 Rigal ....................... A61H 3/00 248/157
3,596,668 A 8/1971 Tosto
3,957,071 A 5/1976 Kenner
4,708,274 A * 11/1987 Roche ...................... A61H 3/00 224/407
5,086,798 A 2/1992 Motts
5,170,810 A * 12/1992 Chapin .................... A61H 3/00 224/281
5,217,032 A * 6/1993 Jobst ........................ A61H 3/00 297/5
5,904,168 A 5/1999 Alulyan
6,883,529 B2 * 4/2005 Kvaternik ................ A61H 3/00 135/66
7,712,477 B2 5/2010 McCarthy
D619,938 S 7/2010 McCarthy
8,256,442 B2 * 9/2012 McCarthy ................ A61H 3/04 482/68
9,883,984 B2 * 2/2018 Reda ........................ A61H 3/04
10,857,058 B1 12/2020 Casibang
D928,669 S 8/2021 Bodman
2005/0121481 A1 * 6/2005 Chiu ........................ A61H 3/00 224/407
2008/0007020 A1 * 1/2008 Holman ................... A61H 3/00 280/87.051
2008/0141911 A1 * 6/2008 McKenna ............. A47B 37/00 135/66
2015/0144166 A1 * 5/2015 Turner ..................... A61H 3/00 135/77

(Continued)

FOREIGN PATENT DOCUMENTS

GB 2476247 B * 11/2011 ............... A61H 3/04
WO WO2021150481 7/2021

*Primary Examiner* — Noah Chandler Hawk

(57) ABSTRACT

A walker shelf system for supporting items on shelves which are storable on the front of a walker includes the walker, a top tray, a bottom tray, and a tray holder. The tray holder is mounted to the front of the walker and defines a slot for simultaneously receiving the top tray and the bottom tray into a stored position. The top tray and the bottom tray are positionable in a top position and a bottom position respectively such that they extend between a first lateral frame and a second lateral frame of the walker.

15 Claims, 7 Drawing Sheets

(56) References Cited

U.S. PATENT DOCUMENTS

| | | | | |
|---|---|---|---|---|
| 2016/0199247 | A1* | 7/2016 | McCuen | A61H 3/04<br>108/26 |
| 2017/0202727 | A1 | 7/2017 | Wegener | |
| 2017/0239128 | A1* | 8/2017 | Flora | A61H 3/04 |
| 2021/0154083 | A1* | 5/2021 | Downes | A61H 3/00 |

* cited by examiner

WALKER SHELF SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mobility assistance walkers and more particularly pertains to a new mobility assistance walker for supporting items on shelves which are storable on the front of the walker.

(2) Description of Related Art Including Information Disclosed Under 37 CFR 1.97 and 1.98

The prior art relates to mobility assistance walkers which shelves for supporting items on the walker. Myriad structures are provided for supporting the items which meet the individual purposes of their designs. However, the prior art does not disclose a walker with a top tray and a bottom tray that extend between crossbars of lateral frames of the walker and which are removable for storage in a tray holder mounted to the front of the walker.

BRIEF SUMMARY OF THE INVENTION

An embodiment of the disclosure meets the needs presented above by generally comprising a walker with a first lateral frame, a second lateral frame, and an upper front crossbar. The first lateral frame includes a first front post, a first rear post, a first upper crossbar, and a first lower crossbar. The first front post and the first rear post each has a top end and a bottom end. The first upper crossbar and the first lower cross bar each extend between the first front post and the first rear post. The second lateral frame includes a second front post, a second rear post, a second upper crossbar, and a second lower crossbar. The second front post and the second rear post each has a top end and a bottom end. The second upper crossbar and the second lower crossbar each extend between the second front post and the second rear post. The upper front crossbar extends between the first front post and the second front post.

A top tray is positioned in a top position wherein the top tray engages the first upper crossbar and the second upper crossbar such that a top surface of the top tray faces away from the first upper crossbar and the second upper crossbar. A bottom tray is positioned in a bottom position wherein the bottom tray engages the first lower crossbar and the second lower crossbar such that a top surface of the bottom tray faces away from the first lower crossbar and the second lower crossbar. A tray holder is coupled to the walker and is positioned on a front side of the walker. The tray holder defines a slot extending laterally with respect to the walker, in which the top tray and the bottom tray are simultaneously positionable in a stored position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
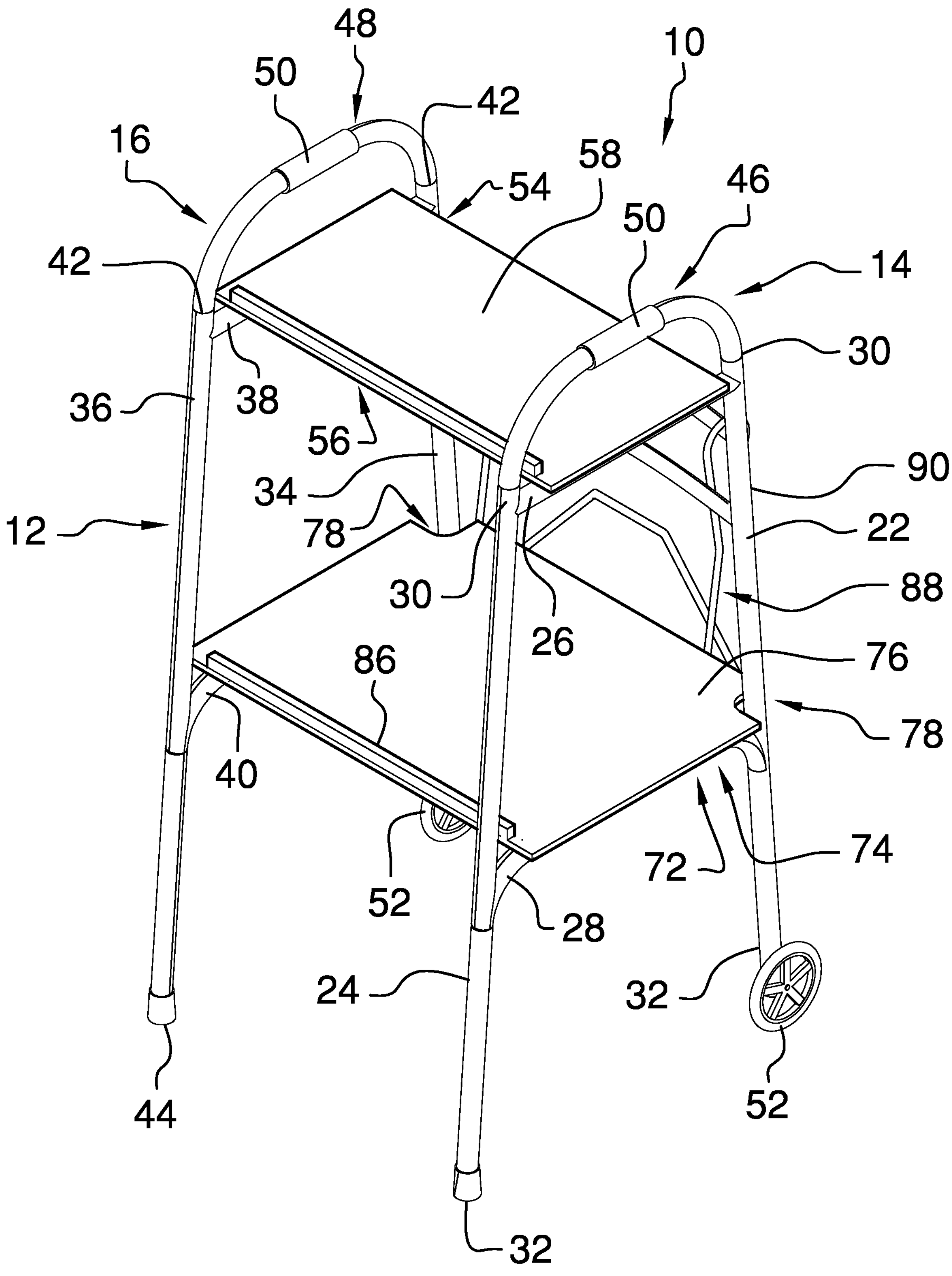
FIG. 1 is a top back side perspective view of a walker shelf system according to an embodiment of the disclosure.
Figure 2:
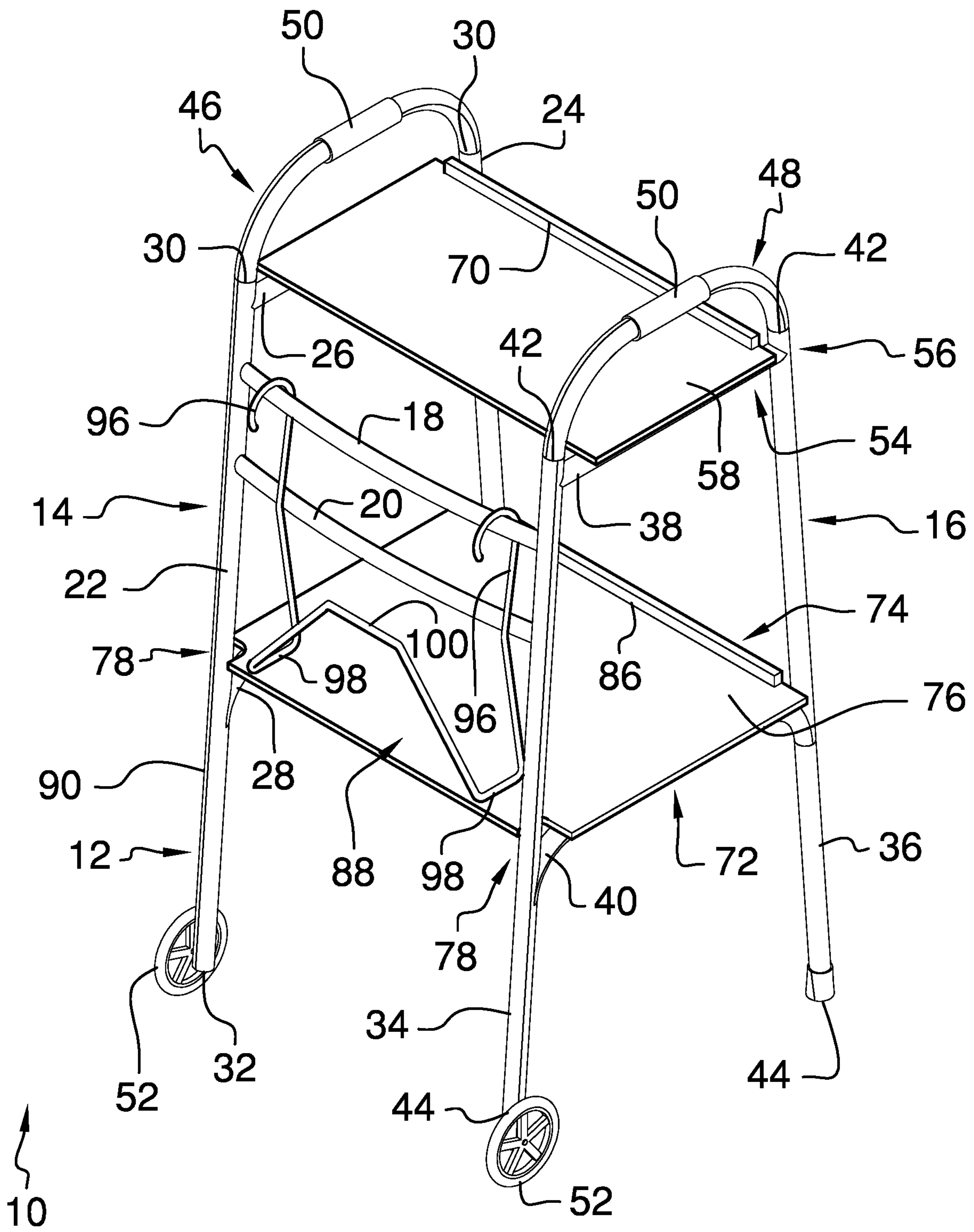
FIG. 2 is a top front side perspective view of an embodiment of the disclosure.
Figure 3:
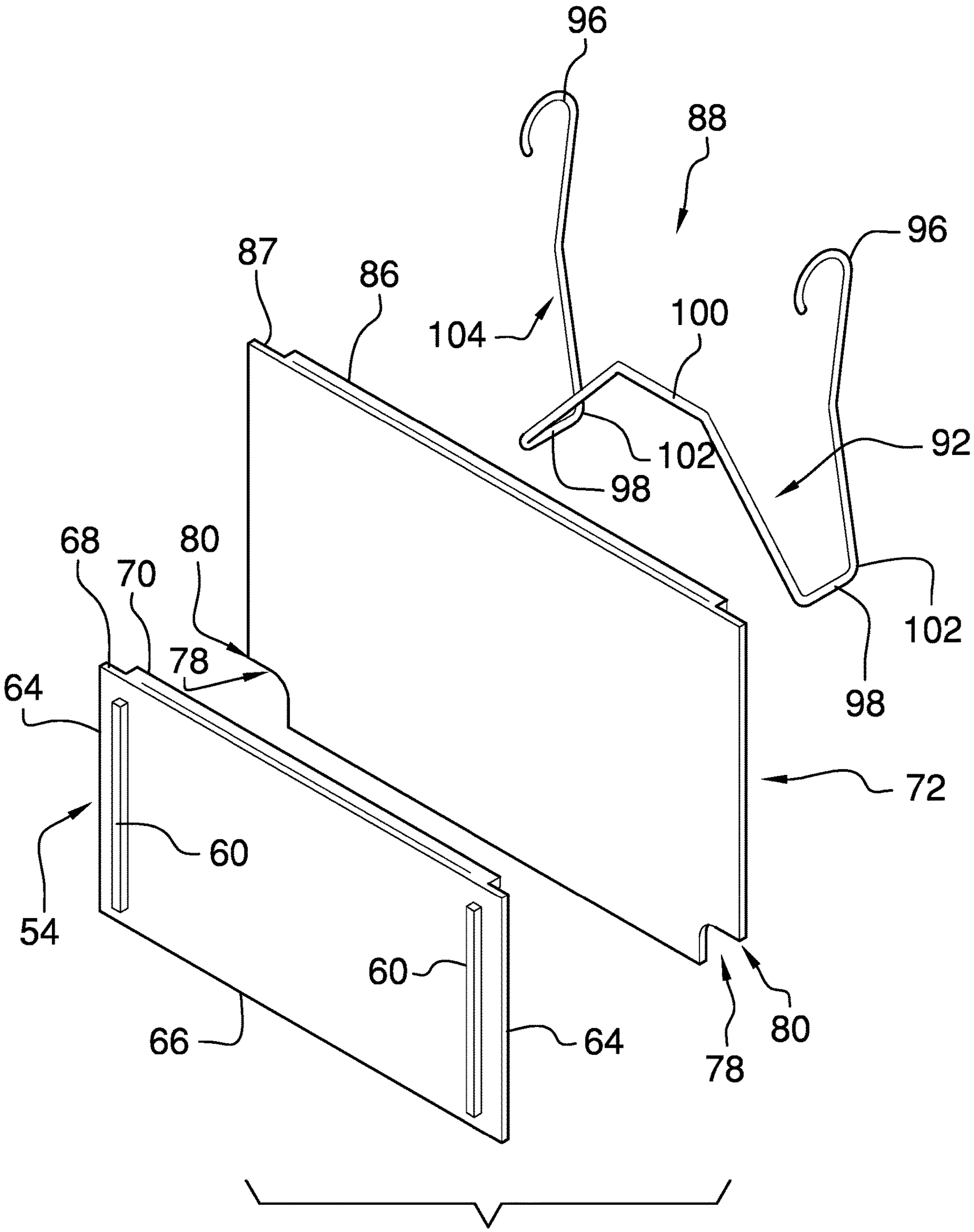
FIG. 3 is a perspective view of a top tray, a bottom tray, and a tray holder according to an embodiment of the disclosure.
Figure 4:
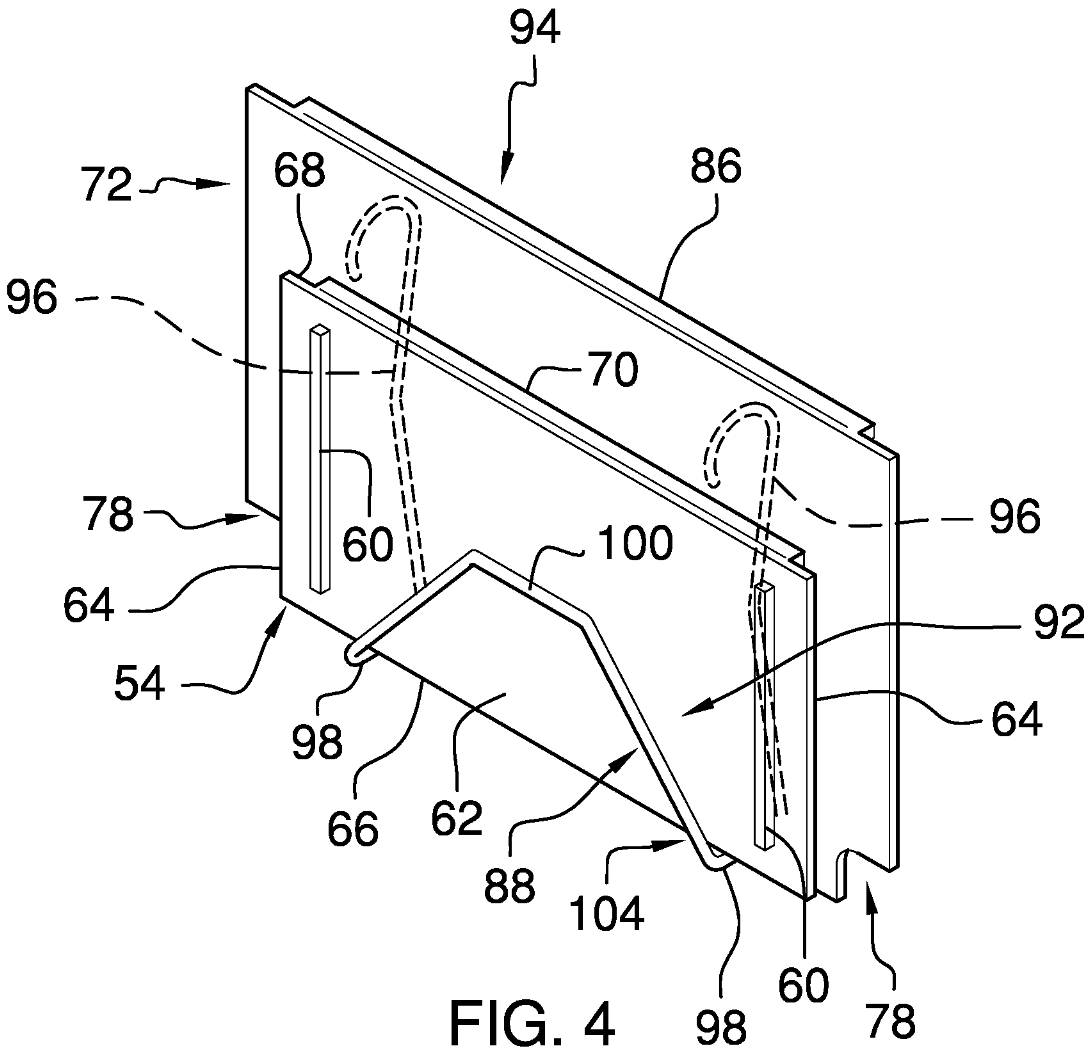
FIG. 4 is a perspective view of a top tray and a bottom tray in a stored position in a tray holder according to an embodiment of the disclosure.
Figure 5:
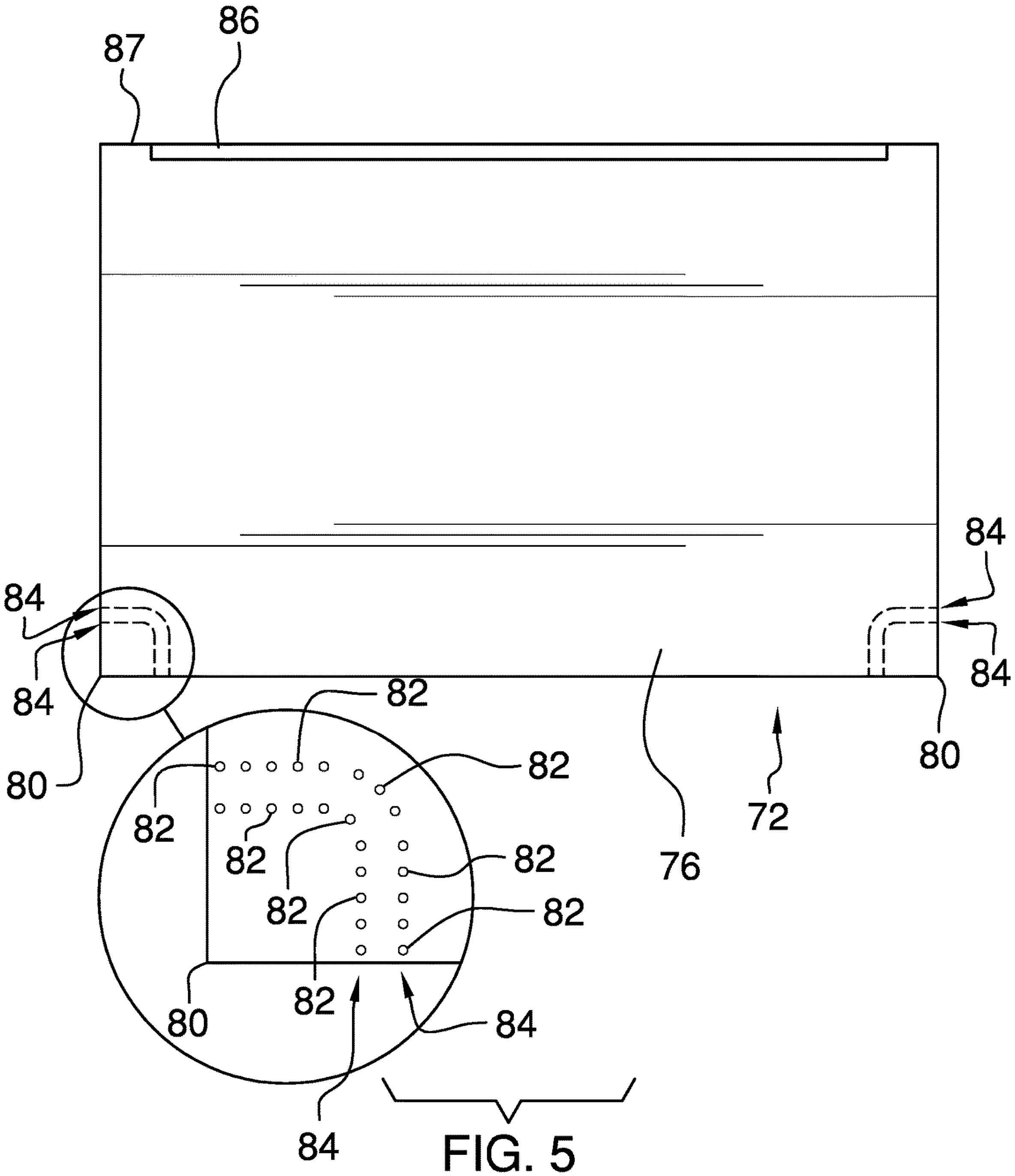
FIG. 5 is a top view of a bottom tray according to an embodiment of the disclosure.
Figure 6:
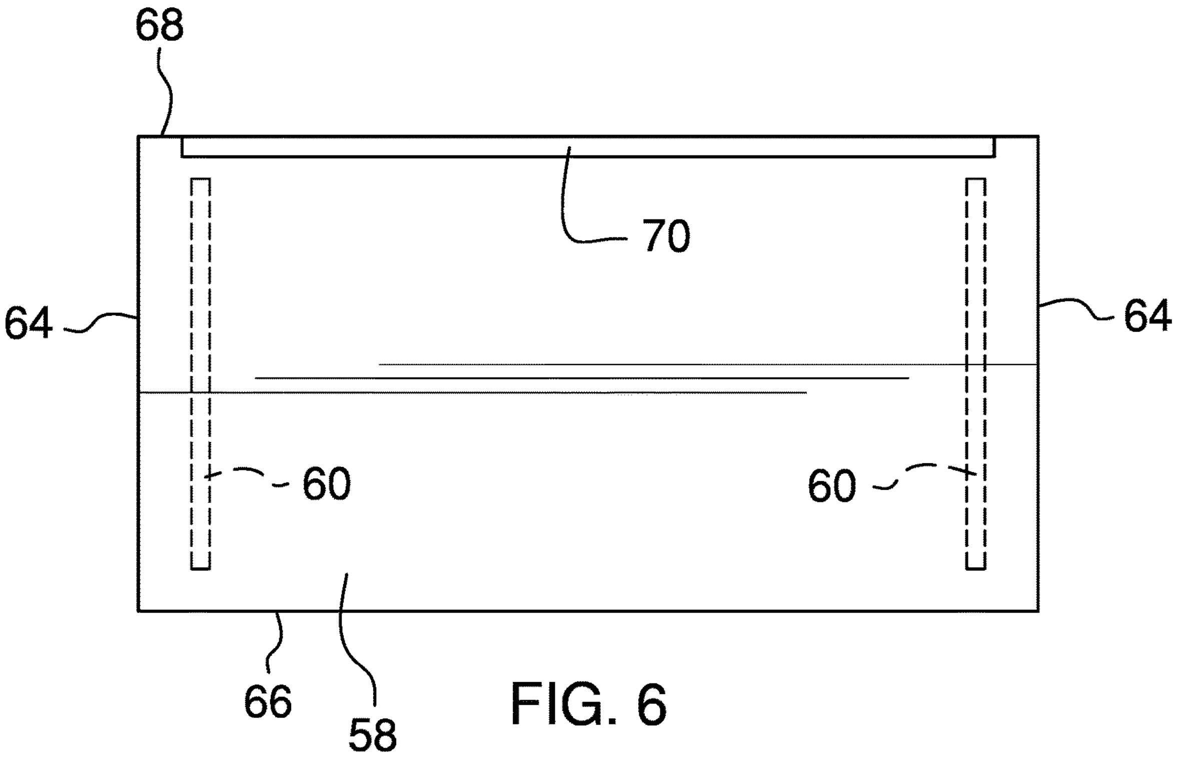
FIG. 6 is a top view of a top tray according to an embodiment of the disclosure.
Figure 7:
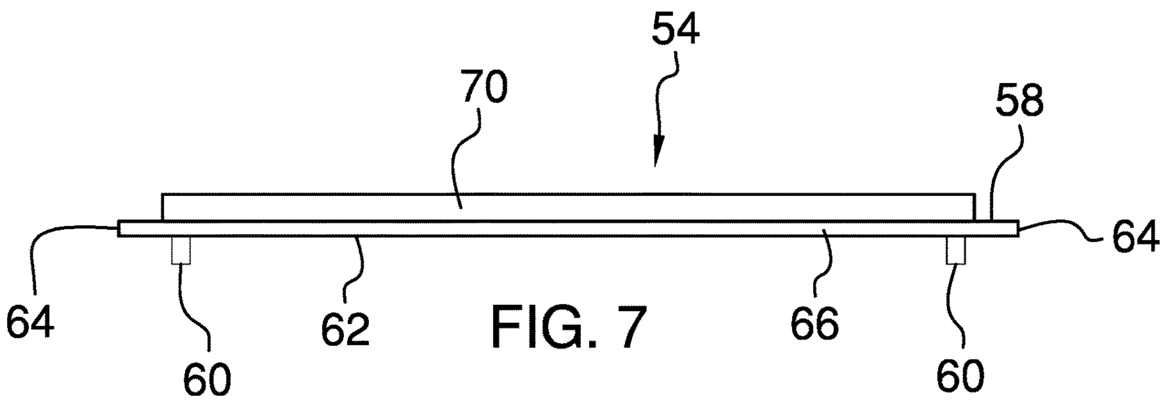
FIG. 7 is a front view of a top tray according to an embodiment of the disclosure.
Figure 8:
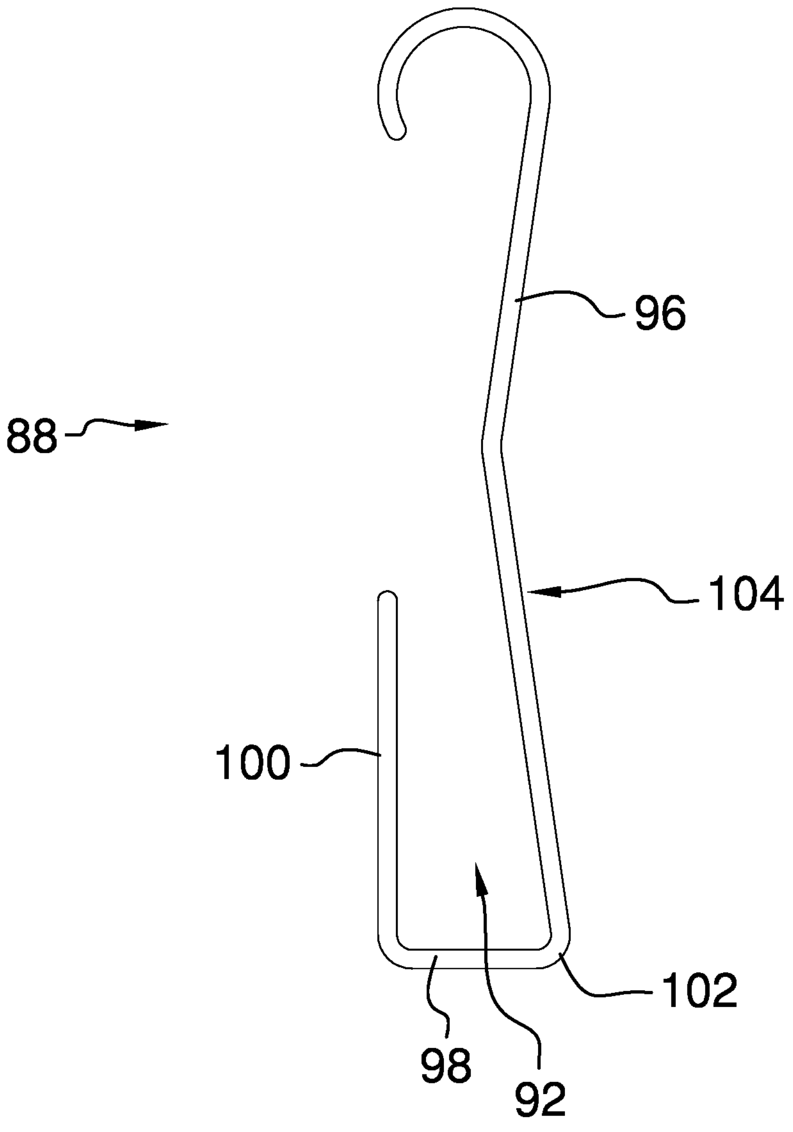
FIG. 8 is a side view of a tray holder according to an embodiment of the disclosure.

With reference now to the drawings, and in particular to FIGS. 1 through 8 thereof, a new mobility assistance walker embodying the principles and concepts of an embodiment of the disclosure and generally designated by the reference numeral 10 will be described.

As best illustrated in FIGS. 1 through 8, the walker shelf system 10 generally comprises a walker 12 comprising a first lateral frame 14, a second lateral frame 16, an upper front crossbar 18, and a lower front crossbar 20. The first lateral frame 14 includes a first front post 22, a first rear post 24, a first upper crossbar 26, and a first lower crossbar 28. The first front post 22 and the first rear post 24 each has a top end 30 and a bottom end 32. The first upper crossbar 26 and the first lower crossbar 28 each extend between the first front post 22 and the first rear post 24. The second lateral frame 16 includes a second front post 34, a second rear post 36, a second upper crossbar 38, and a second lower crossbar 40. The second front post 34 and the second rear post 36 each has a top end 42 and a bottom end 44. The second upper crossbar 38 and the second lower crossbar 40 each extend between the second front post 34 and the second rear post 36. The upper front crossbar 18 and the lower front crossbar 20 each extend between the first front post 22 and the second front post 34.

The walker 12 also includes a first handle 46, a second handle 48, a pair of grips 50, and a pair of wheels 52. The first handle 46 is coupled to and extends between the top end 30 of the first front post 22 and the top end 32 of the first rear post 24, and the first handle 46 curves downwardly toward each of the first front post 22 and the first rear post 24. The second handle 48 is coupled to and extends between the top end 42 of the second front post 34 and the top end 44 of the second rear post 36, and the first handle 46 curves downwardly toward each of the first front post 22 and the first rear post 24. Each grip 50 of the pair of grips 50 is coupled to and extends around a respective one of the first handle 46 and the second handle 48. Each wheel 52 of the pair of wheels 52 is rotatably coupled to a respective one of the first front post 22 and the second front post 34, and each wheel 52 of the pair of wheels 52 is concentrically positioned and shares a common rotational axis.

A top tray 54 is positioned in a top position 56 wherein the top tray 54 engages the first upper crossbar 26 and the second upper crossbar 38 such that a top surface 58 of the top tray 54 faces away from the first upper crossbar 26 and the second upper crossbar 38. Each retainer 60 of a pair of retainers 60 is coupled to a bottom surface 62 of the top tray 54 and engages a respective one of the first upper crossbar 26 and the second upper crossbar 38 to restrict lateral movement of the top tray 54 relative to the walker 12. Each retainer 60 of the pair of retainers 60 is positioned adjacent to a respective lateral edge 64 of a pair of lateral edges 64 of the top tray 54 and extends between a front edge 66 and a rear edge 68 of the top tray 54. The top tray 54 is positioned between the first front post 22 and the first rear post 24 and between the second front post 34 and the second rear post 36 such that forward and rearward movements of the top tray 54 relative to the walker 12 are restricted. A top lip 70 is coupled to the top surface 58 of the top tray 54 and extends along the rear edge 68 of the top tray 54.

A bottom tray 72 is positioned in a bottom position 74 in which the bottom tray 72 engages the first lower crossbar 28 and the second lower crossbar 40 such that a top surface 76 of the bottom tray 72 faces away from the first lower crossbar 28 and the second lower crossbar 40. The bottom tray 72 is positioned between the first front post 22 and the first rear post 24 and between the second front post 34 and the second rear post 36 such that forward and rearward movements of the bottom tray 72 relative to the walker 12 are restricted. The bottom tray 72 has a pair of cutouts 78, each of which is positioned in a respective one of a pair of front corners 80 of the bottom tray 72. Each cutout 78 of the pair of cutouts 78 receives a respective one of the first front post 22 and the second front post 34. The bottom tray 72 is partially positioned between the first front post 22 and the second front post 34 such that lateral movement of the bottom tray 72 relative to the walker 12 is restricted. The bottom tray 72 has a plurality of perforations 82 which extend through the bottom tray 72 and are arranged in a plurality of cutout paths 84. Each cutout path 84 of the plurality of cutout paths 84 is positioned adjacent to a respective one of the pair of front corners 80 of the bottom tray 72. Each cutout 78 of the pair of cutouts 78 is formed by shearing along a respective selected one of the plurality of cutout paths 84. A bottom lip 86 is coupled to the bottom surface of the bottom tray 72 and extends along a rear edge 87 of the bottom tray 72.

A tray holder 88 is coupled to the walker 12 and is positioned on a front side 90 of the walker 12. The tray holder 88 defines a slot 92 extending laterally with respect to the walker 12. The top tray 54 and the bottom tray 72 are simultaneously positionable in a stored position 94 in which each of the top tray 54 and the bottom tray 72 are positioned within the slot 92. The top surface 58 of the top tray 54 and the top surface 76 of the bottom tray 72 are oriented vertically when the top tray 54 and the bottom tray 72 are positioned in the stored position 94.

The tray holder 88 comprises a pair of hooks 96, a pair of support members 98, and a front member 100. Each hook 96 of the pair of hooks 96 engages the upper front crossbar 18 to hang from the upper front crossbar 18 and engages the lower front crossbar 20 to retain the tray holder 88 forwardly of the lower front crossbar 20. Each support member 98 extends forwardly from a bottom end 102 of a respective hook 96 of the pair of hooks 96. Each support member 98 of the pair of support members 98 also engages the top tray 54 and the bottom tray 72 when the top tray 54 and the bottom tray 72 are positioned in the stored position 94. The front member 100 is coupled to and extends between each support member 98 of the pair of support members 98. The front member 100 also extends upwardly from each support member 98 of the pair of support members 98. The slot 92 is bounded by the pair of hooks 96, the pair of support members 98, and the front member 100. The tray holder 88 is formed of a continuous wire 104.

In use, the top tray 54 and the bottom tray 72 are positioned in the top position 56 and the bottom position 74 respectively such that the top surface 58, 76 of each of the top tray 54 and the bottom tray 72 can support items. The top tray 54 and the bottom tray 72 may be positioned in the stored position 94 when not being used for supporting the items.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A walker shelf system comprising:
a walker comprising:
a first lateral frame including a first front post, a first rear post, a first upper crossbar, and a first lower crossbar, said first front post and said first rear post each having a top end and a bottom end, said first upper crossbar extending between said first front post and said first rear post, said first lower crossbar extending between said first front post and said first rear post;
a second lateral frame including a second front post, a second rear post, a second upper crossbar, and a second lower crossbar, said second front post and said second rear post each having a top end and a bottom end, said second upper crossbar extending between said second front post and said second rear post, said second lower crossbar extending between said second front post and said second rear post; and
an upper front crossbar extending between said first front post and said second front post;
a top tray being positioned in a top position wherein said top tray engages said first upper crossbar and said second upper crossbar such that a top surface of said top tray faces away from said first upper crossbar and said second upper crossbar;
a bottom tray being positioned in a bottom position wherein said bottom tray engages said first lower crossbar and said second lower crossbar such that a top surface of said bottom tray faces away from said first lower crossbar and said second lower crossbar;
a tray holder being coupled to said walker and being positioned on a front side of said walker, said tray holder defining a slot extending laterally with respect to said walker, said top tray and said bottom tray being simultaneously positionable in a stored position wherein each of said top tray and said bottom tray are positioned within said slot; and
wherein said walker further comprises a lower front crossbar extending between said first front post and said second front post, said tray holder comprising
a pair of hooks, each hook of said pair of hooks engaging said upper front crossbar to hang from said upper front crossbar, each hook of said pair of hooks engaging said lower front crossbar to retain said tray holder forwardly of said lower front crossbar;
a pair of support members, each support member extending forwardly from a bottom end of a respective hook of said pair of hooks, each support member of said pair of support members engaging said top tray and said bottom tray when said top tray and said bottom tray are positioned in said stored position; and
a front member being coupled to and extending between each support member of said pair of support members, said front member extending upwardly from each support member of said pair of support members, said slot being bounded by said pair of hooks, said pair of support members, and said front member, said tray holder being formed of a continuous wire.

2. The system of claim 1, further comprising a pair of retainers, each retainer of said pair of retainers being coupled to a bottom surface of said top tray, each retainer engaging a respective one of said first upper crossbar and said second upper crossbar to restrict lateral movement of said top tray relative to said walker.

3. The system of claim 2, wherein each retainer of said pair of retainers is positioned adjacent to a respective lateral edge of a pair of lateral edges of said top tray and extends between a front edge and a rear edge of said top tray.

4. The system of claim 1, wherein said top tray is positioned between said first front post and said first rear post and between said second front post and said second rear post such that forward and rearward movements of said top tray relative to said walker are restricted.

5. The system of claim 1, further comprising a top lip being coupled to said top surface of said top tray, said top lip extending along said rear edge of said top tray.

6. The system of claim 1, wherein said bottom tray is positioned between said first front post and said first rear post and between said second front post and said second rear post such that forward and rearward movements of said top tray relative to said walker are restricted.

7. The system of claim 6, wherein said bottom tray has a pair of cutouts, each cutout of said pair of cutouts being positioned in a respective one of a pair of front corners of said bottom tray, each cutout of said pair of cutouts receiving a respective one of said first front post and said second front post, wherein said bottom tray is partially positioned between said first front post and said second front post such that lateral movement of said bottom tray relative to said walker is restricted.

8. The system of claim 1, further comprising a bottom lip being coupled to said bottom surface of said bottom tray, said bottom lip extending along a rear edge of said bottom tray.

9. The system of claim 1, wherein said top surface of said top tray and said top surface of said bottom tray are oriented vertically when said top tray and said bottom tray are positioned in said stored position.

10. The system of claim 1, wherein said walker further comprises:
a first handle being coupled to and extending between said top end of said first front post and said top end of said first rear post;
a second handle being coupled to and extending between said top end of said second front post and said top end of said second rear post.

11. The system of claim 10, wherein said first handle curves downwardly toward each of said first front post and said first rear post, said first handle curving downwardly toward each of said first front post and said first rear post.

12. The system of claim 10, wherein said walker further comprises a pair of grips, each grip of said pair of grips being coupled to and extending around a respective one of said first handle and said second handle.

13. The system of claim 1, wherein said walker further comprises a pair of wheels, each wheel of said pair of wheels being rotatably coupled to a respective one of said first front post and said second front post, said pair of wheels being concentrically positioned and sharing a common rotational axis.

14. A walker shelf system comprising:
a walker comprising:
a first lateral frame including a first front post, a first rear post, a first upper crossbar, and a first lower crossbar, said first front post and said first rear post each having a top end and a bottom end, said first upper crossbar extending between said first front post and said first rear post, said first lower crossbar extending between said first front post and said first rear post;

a second lateral frame including a second front post, a second rear post, a second upper crossbar, and a second lower crossbar, said second front post and said second rear post each having a top end and a bottom end, said second upper crossbar extending between said second front post and said second rear post, said second lower crossbar extending between said second front post and said second rear post; and an upper front crossbar extending between said first front post and said second front post;

a top tray being positioned in a top position wherein said top tray engages said first upper crossbar and said second upper crossbar such that a top surface of said top tray faces away from said first upper crossbar and said second upper crossbar;

a bottom tray being positioned in a bottom position wherein said bottom tray engages said first lower crossbar and said second lower crossbar such that a top surface of said bottom tray faces away from said first lower crossbar and said second lower crossbar;

a tray holder being coupled to said walker and being positioned on a front side of said walker, said tray holder defining a slot extending laterally with respect to said walker, said top tray and said bottom tray being simultaneously positionable in a stored position wherein each of said top tray and said bottom tray are positioned within said slot;

wherein said bottom tray is positioned between said first front post and said first rear post and between said second front post and said second rear post such that forward and rearward movements of said top tray relative to said walker are restricted;

wherein said bottom tray has a pair of cutouts, each cutout of said pair of cutouts being positioned in a respective one of a pair of front corners of said bottom tray, each cutout of said pair of cutouts receiving a respective one of said first front post and said second front post, wherein said bottom tray is partially positioned between said first front post and said second front post such that lateral movement of said bottom tray relative to said walker is restricted; and wherein said bottom tray has a plurality of perforations extending through said bottom tray, said plurality of perforations being arranged in a plurality of cutout paths, each cutout path of said plurality of cutout paths being positioned adjacent to a respective one of said pair of front corners of said bottom tray, each cutout of said pair of cutouts being formed by shearing along a respective selected one of said plurality of cutout paths.

15. A walker shelf system comprising:

a walker comprising:

a first lateral frame including a first front post, a first rear post, a first upper crossbar, and a first lower crossbar, said first front post and said first rear post each having a top end and a bottom end, said first upper crossbar extending between said first front post and said first rear post, said first lower crossbar extending between said first front post and said first rear post;

a second lateral frame including a second front post, a second rear post, a second upper crossbar, and a second lower crossbar, said second front post and said second rear post each having a top end and a bottom end, said second upper crossbar extending between said second front post and said second rear post, said second lower crossbar extending between said second front post and said second rear post;

an upper front crossbar extending between said first front post and said second front post;

a lower front crossbar extending between said first front post and said second front post;

a first handle being coupled to and extending between said top end of said first front post and said top end of said first rear post, said first handle curving downwardly toward each of said first front post and said first rear post;

a second handle being coupled to and extending between said top end of said second front post and said top end of said second rear post, said first handle curving downwardly toward each of said first front post and said first rear post;

a pair of grips, each grip of said pair of grips being coupled to and extending around a respective one of said first handle and said second handle; and a pair of wheels, each wheel of said pair of wheels being rotatably coupled to a respective one of said first front post and said second front post, said pair of wheels being concentrically positioned and sharing a common rotational axis;

a top tray being positioned in a top position wherein said top tray engages said first upper crossbar and said second upper crossbar such that a top surface of said top tray faces away from said first upper crossbar and said second upper crossbar;

a pair of retainers, each retainer of said pair of retainers being coupled to a bottom surface of said top tray, each retainer engaging a respective one of said first upper crossbar and said second upper crossbar to restrict lateral movement of said top tray relative to said walker, each retainer of said pair of retainers being positioned adjacent to a respective lateral edge of a pair of lateral edges of said top tray and extending between a front edge and a rear edge of said top tray, said top tray being positioned between said first front post and said first rear post and between said second front post and said second rear post such that forward and rearward movements of said top tray relative to said walker are restricted;

a top lip being coupled to said top surface of said top tray, said top lip extending along said rear edge of said top tray;

a bottom tray being positioned in a bottom position wherein said bottom tray engages said first lower crossbar and said second lower crossbar such that a top surface of said bottom tray faces away from said first lower crossbar and said second lower crossbar, said bottom tray being positioned between said first front post and said first rear post and between said second front post and said second rear post such that forward and rearward movements of said bottom tray relative to said walker are restricted, said bottom tray having a pair of cutouts, each cutout of said pair of cutouts being positioned in a respective one of a pair of front corners of said bottom tray, each cutout of said pair of cutouts receiving a respective one of said first front post and said second front post, wherein said bottom tray is partially positioned between said first front post and said second front post such that lateral movement of said bottom tray relative to said walker is restricted, said bottom tray having a plurality of perforations extending through said bottom tray, said plurality of perforations being arranged in a plurality of cutout paths, each cutout path of said plurality of cutout paths being positioned adjacent to a respective one of said pair of front corners of said bottom tray, each cutout of said pair of cutouts being formed by shearing along a respective selected one of said plurality of cutout paths;

a bottom lip being coupled to said bottom surface of said bottom tray, said bottom lip extending along a rear edge of said bottom tray; and a tray holder being coupled to said walker and being positioned on a front side of said walker, said tray holder defining a slot extending laterally with respect to said walker, said top tray and said bottom tray being simultaneously positionable in a stored position wherein each of said top tray and said bottom tray are positioned within said slot, said top surface of said top tray and said top surface of said bottom tray being oriented vertically when said top tray and said bottom tray are positioned in said stored position, said tray holder comprising:

a pair of hooks, each hook of said pair of hooks engaging said upper front crossbar to hang from said upper front crossbar, each hook of said pair of hooks engaging said lower front crossbar to retain said tray holder forwardly of said lower front crossbar;

a pair of support members, each support member extending forwardly from a bottom end of a respective hook of said pair of hooks, each support member of said pair of support members engaging said top tray and said bottom tray when said top tray and said bottom tray are positioned in said stored position; and a front member being coupled to and extending between each support member of said pair of support members, said front member extending upwardly from each support member of said pair of support members, said slot being bounded by said pair of hooks, said pair of support members, and said front member, said tray holder being formed of a continuous wire.

* * * * *